(12) United States Patent
Park

(10) Patent No.: US 7,374,373 B1
(45) Date of Patent: May 20, 2008

(54) POCKET HOLE DRILLING MACHINE

(76) Inventor: Joon Park, 1320 Virginia Ave., Glendale, CA (US) 91202

( * ) Notice: Subject to any disclaimer, the term of this patent is extended or adjusted under 35 U.S.C. 154(b) by 422 days.

(21) Appl. No.: 11/158,403

(22) Filed: Jun. 21, 2005

Related U.S. Application Data

(60) Provisional application No. 60/582,332, filed on Jun. 23, 2004.

(51) Int. Cl.
B23B 47/28 (2006.01)
(52) U.S. Cl. .............. 408/12; 408/46; 408/53; 408/87; 408/103; 408/115 R
(58) Field of Classification Search ............ 408/12–13, 408/46, 51–53, 87, 95, 97, 98, 103, 115 R
See application file for complete search history.

(56) References Cited

U.S. PATENT DOCUMENTS

| 1,755,401 | A | * | 4/1930 | Koehl et al. | .............. | 408/51 |
| 1,982,025 | A | * | 11/1934 | Russell | .............. | 408/62 |
| 3,452,792 | A | * | 7/1969 | Foreman | .............. | 408/50 |
| 4,419,031 | A | * | 12/1983 | Palma | .............. | 408/1 R |
| 5,765,273 | A | * | 6/1998 | Mora et al. | .............. | 29/560 |
| 5,769,574 | A | * | 6/1998 | Feinsod | .............. | 408/1 R |
| 6,599,064 | B1 | * | 7/2003 | Robinson | .............. | 408/110 |
| 6,955,508 | B1 | * | 10/2005 | Radcliffe | .............. | 408/37 |

FOREIGN PATENT DOCUMENTS

| EP | 1595627 | A2 | * | 11/2005 |
| FR | 2712219 | A1 | * | 5/1995 |
| JP | 03213235 | A | * | 9/1991 |

* cited by examiner

Primary Examiner—Daniel W. Howell

(57) ABSTRACT

A pocket-hole drilling apparatus for drilling pocket-holes in a workpiece is disclosed. In one embodiment, an initiation switch actuates clamping the workpiece and the movement of a drilling module to cut a pocket-hole. The drilling module has a motor and a step-drill mounted thereon, which is slidably mounted on a guide module. The axis of the drilling module movement intersects work surface. In another embodiment, a movable fence provides the adjustability of pocket-hole depth. In yet another embodiment, two actuator tips are disposed in a fence to prevent the drilling of a pocket-hole through the sidewall of a workpiece. In still another embodiment, a short stroke clamping actuator is used to prevent human finger injury. In still another embodiment, a blower or an ejector pump is used to remove wood chips, wherein the blower is either attached to a drilling motor or to a separate blower motor; the ejector pump is mounted near the drill guide. In still another embodiment, two pocket-drills are slidably mounted on a block so as to drill two pocket-holes and to adjust pocket-hole spacing. In still another embodiment, a mounting structure is disposed either underneath or above the work surface to mount drilling module(s) so as to drill multiple pocket-holes into a wide workpiece at one setup. In still another embodiment, a drill guide forms a clearance for the cutting edges of the step-drill to minimize wear on the edges. In a further embodiment, an actuator provides both clamping and drilling movements, wherein the actuator is an electric motor or a hand lever.

23 Claims, 7 Drawing Sheets

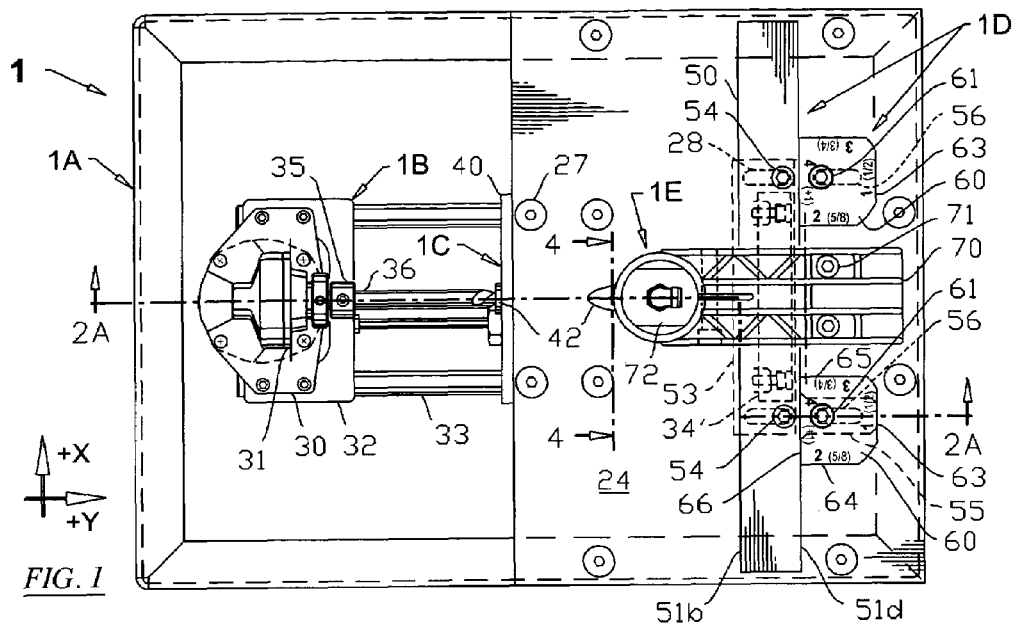
FIG. 1
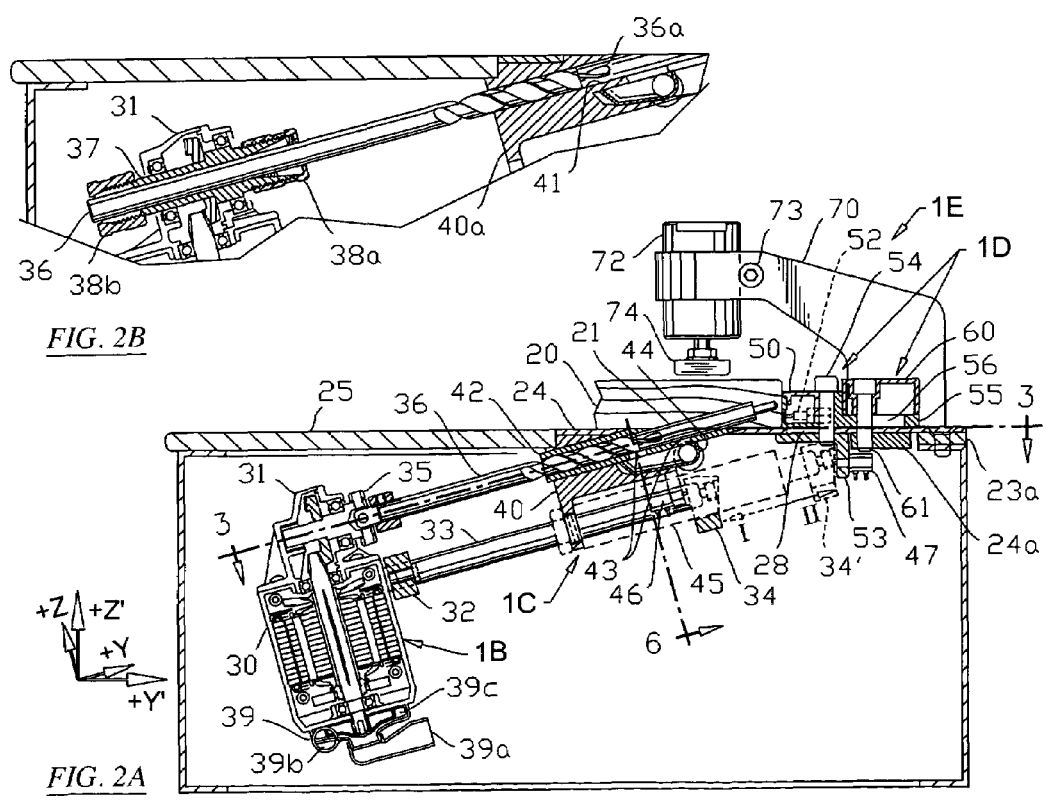
FIG. 2B
FIG. 2A

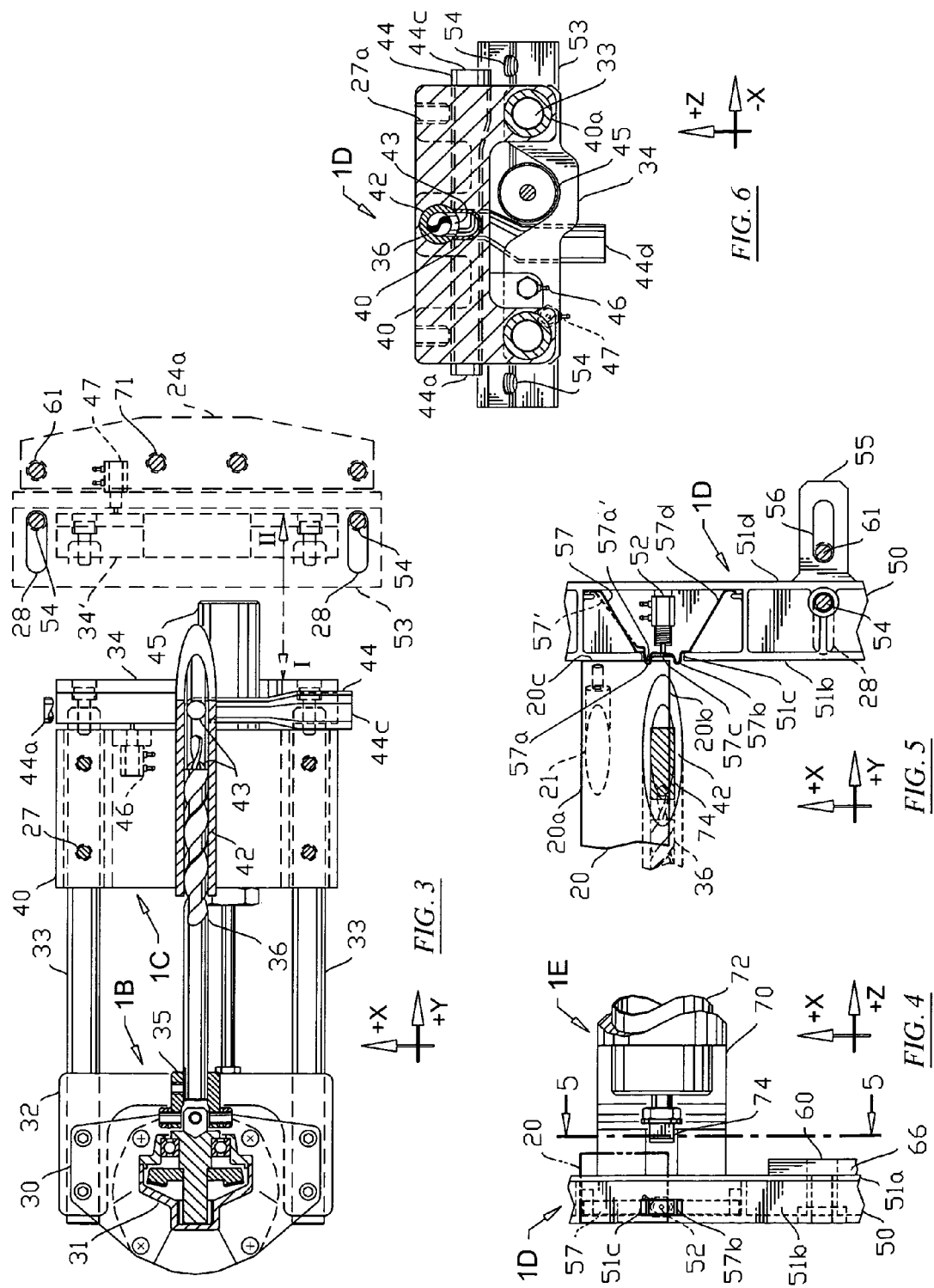

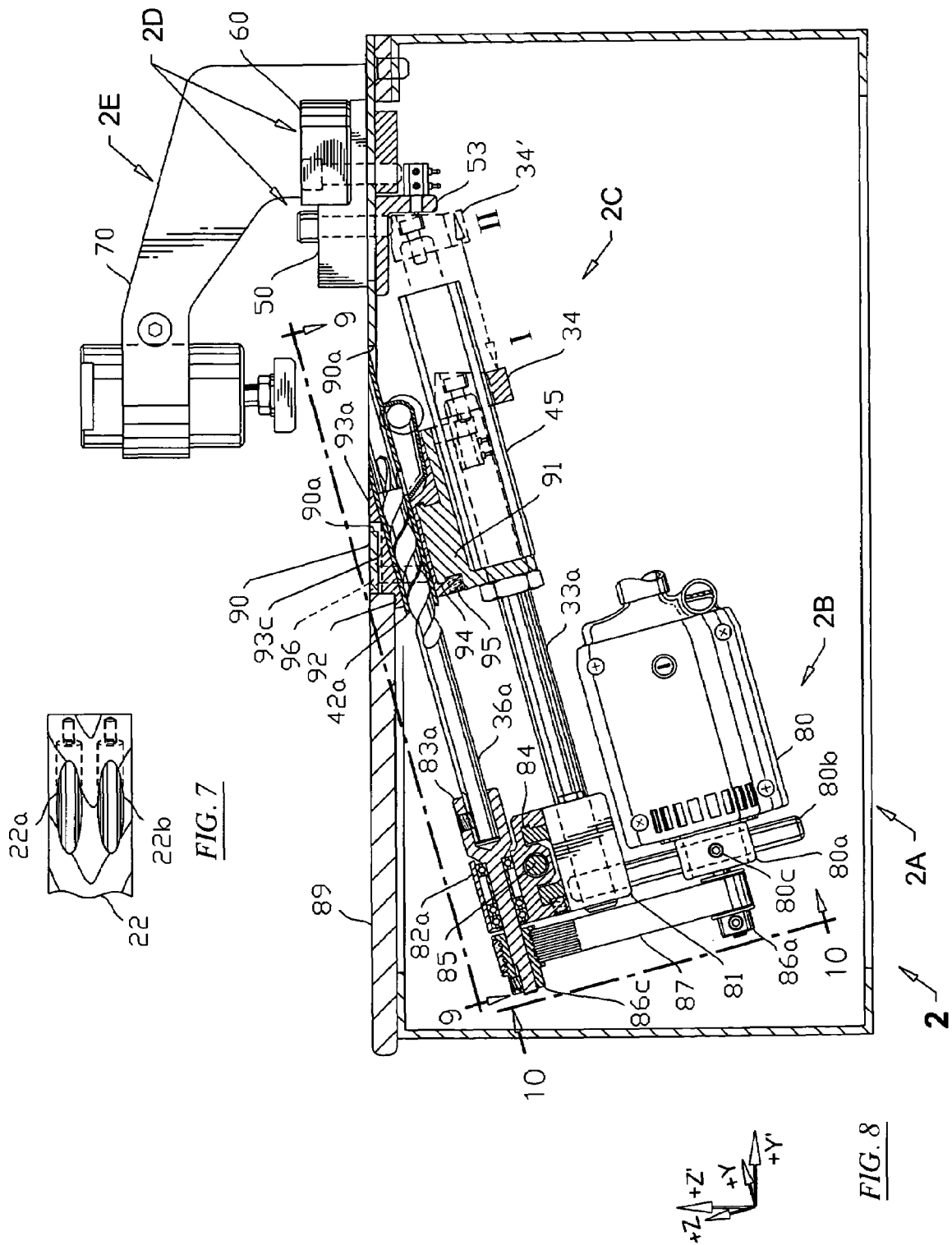

POCKET HOLE DRILLING MACHINE

CROSS-REFERENCE TO RELATED APPLICATION

This application fully incorporates by reference the contents of and relies for priority on U.S. Provisional Application No. 60/582,332, entitled "Pocket-hole drilling machine" filed Jun. 23, 2004.

FIELD OF THE INVENTION

This invention is directed to a pocket-hole drilling machine that clamps a wood workpiece to be drilled and generates pocket-hole openings for subsequent fastening to another workpiece by screws.

BACKGROUND OF THE INVENTION

Two wood workpieces are sometimes fastened together by means of a pocket joint. A pocket joint is a pocket-hole in the first piece, with a screw in the pocket-hole extending into the second workpiece. A pocket-hole is one that is made at an angle in the first piece of wood, entering from one surface and exiting out of the edge-wall. Usually the pocket is sufficiently large to fully contain the head of the screw so that when the screw is recessed in the hole, it is not exposed.

Generally, pocket-holes have been generated by pocket-hole jigs with a portable drill motor or by pocket-hole drilling machines that take advantage of speed and easy setup. The commercially available pocket-hole drilling machines require a foot switch to start a cycle. Furthermore, these drilling machines do not allow a user to adjust the vertical location or depth of a pocket-hole on a workpiece according to its thickness.

Therefore, it is desirable to provide a machine with flexibility to drill pocket-holes in a speedy and efficient manner with one or more of the following features: 1) the ability to start and finish a cycle without a foot or hand operated switch; 2) an adjustable fence; 3) improved clamping; 4) the ability to remove wood chips; 5) the ability to adjust the spacing between two pocket-holes; 6) the ability to drill plural pocket-holes simultaneously in a wider workpiece; 7) the ability to drill plural pocket-holes and dowel-holes simultaneously in a wide board that is to be joined to a side panel; 8) a radial clearance in the drill guide to extend the life of a step-drill, and 9) use of a lever or a secondary electric motor to eliminate use of compressed air.

SUMMARY OF THE INVENTION

In an exemplary embodiment according to the present invention, a pocket-hole drilling implement for drilling pocket-holes in a workpiece is provided. The implement includes a body with a top surface, a drilling module consisting of a motor and one step-drill mounted thereon, a fence movably mounted on the top surface, wherein drilling module is slidably mounted on a guide module, wherein the guide module with a drill guide that intersects said top surface, and at least one initiation switch that actuates clamping a workpiece and movement of the drilling module to form a pocket-hole within, wherein the initiation switch is disposed in the fence.

In another exemplary embodiment according to the present invention, a pocket-hole drilling implement further provides a movable fence, wherein the fence having a relationship with the drilling depth of the step-drill so as to handle different thickness of workpieces.

In yet another exemplary embodiment according to the present invention, a pocket-hole drilling implement further provides a short stroke clamping actuator to clamp a workpiece prior to drilling so that a human finger cannot be placed between underneath a clamp pad and on top of a workpiece.

In still another exemplary embodiment according to the present invention, a pocket-hole drilling implement further provides a clamp pad sized to the width of a pocket-hole and two actuator tips that actuates drilling only when a workpiece is placed above the step-drill to prevent drilling a pocket-hole on the sidewall of a workpiece, wherein an actuation switch has a relationship to the two actuator tips.

In still another exemplary embodiment according to the present invention, a pocket-hole drilling implement further provides a blower or an ejector pump to remove wood chips, wherein the blower is either attached to the motor shaft or a separate blower to operate the same mode as the motor does, wherein the ejector pump is mounted near the drill guide.

In still another exemplary embodiment according to the present invention, a pocket-hole drilling implement further provides two pocket-drills that are laterally slidably mounted on a drilling block so that a user can adjust the pocket-hole spacing in-between.

In still another exemplary embodiment according to the present invention, a pocket-hole drilling implement further provides a unit module that includes a drilling module and a guide module, wherein the drilling module is slidably mounted on a guide module, and the unit module is detachably mounted onto a mounting structure, wherein the mounting structure is at a right angle with respect to the drilling direction. A user can select a number of the unit modules and mount them on the mounting structure to drill multiple pocket-holes into a wide workpiece in one setup.

In still another exemplary embodiment according to the present invention, a pocket-hole drilling implement further provides at least two horizontally slidable dowel drilling heads that drill dowel-holes on the edge of a board that is to be joined to a side panel, wherein the dowel drilling heads are mounted opposite to the drilling module.

In still another exemplary embodiment according to the present invention, a pocket-hole drilling implement further provides a drill guide that has a clearance for cutting edges of the step-drill so that the wear of the step-drill is minimized.

In a further exemplary embodiment according to the present invention, a pocket-hole drilling implement further provides an actuator that provides clamping and drilling movements, wherein the actuator is an electric motor or a lever.

Other objects and advantages of this invention will be understood from the following specification and claims.

BRIEF DESCRIPTION OF THE DRAWINGS

These and other aspects of the invention may be described in reference to the following detailed description, taken in conjunction with the accompanying drawings.

FIG. 1 is a top view of a first exemplary embodiment 1 of a pocket-hole drilling implement in accordance with the present invention, showing a frame 1A without a removable plate, a drilling module 1B, a guide module 1C, a fence module 1D, and a clamping module 1E.

FIG. 2A is a side cross-sectional view taken along the line 2-2 of FIG. 1, showing the drilling module 1B at home position and a first wood workpiece placed on the main plate.

FIG. 2B is an enlarged partial side cross-sectional view showing a step-drill rigidly mounted on an output shaft of the motor.

FIG. 3 is an enlarged top sectional view taken along the line 3-3 of FIG. 2A, showing the relationship between a bar tie at home position and at drilling position noted as I and II, respectively.

FIG. 4 is a front view taken along the line 4-4 of FIG. 1, showing the clamping module 1E and the fence module 1D.

FIG. 5 is a top view taken along the line 5-5 of FIG. 4, showing the positional relationship among a first workpiece with drilled pocket-hole, an actuation plunger, a clamp pad, a step-drill, a fence without its cover, and a turret.

FIG. 6 is an enlarged sectional view taken along the line 6 of FIG. 2A, showing the cross-section of the guide module 1C and the partial view of a bar tie and an L-bracket.

FIG. 7 is a top view of a second relatively narrow workpiece showing two pocket-holes drilled adjacent to each other.

FIG. 8 is a side sectional view taken along the line 8-8 of FIG. 10 of a second exemplary embodiment 2 of a two pocket-hole drilling implement in accordance with the present invention, showing the relationship among a frame 2A, a dual drilling module 2B, a dual guide module 2C, a fence module 2D, and a clamping module 2E.

DETAILED DESCRIPTION OF THE EXEMPLARY EMBODIMENTS

Figures 9, 10:
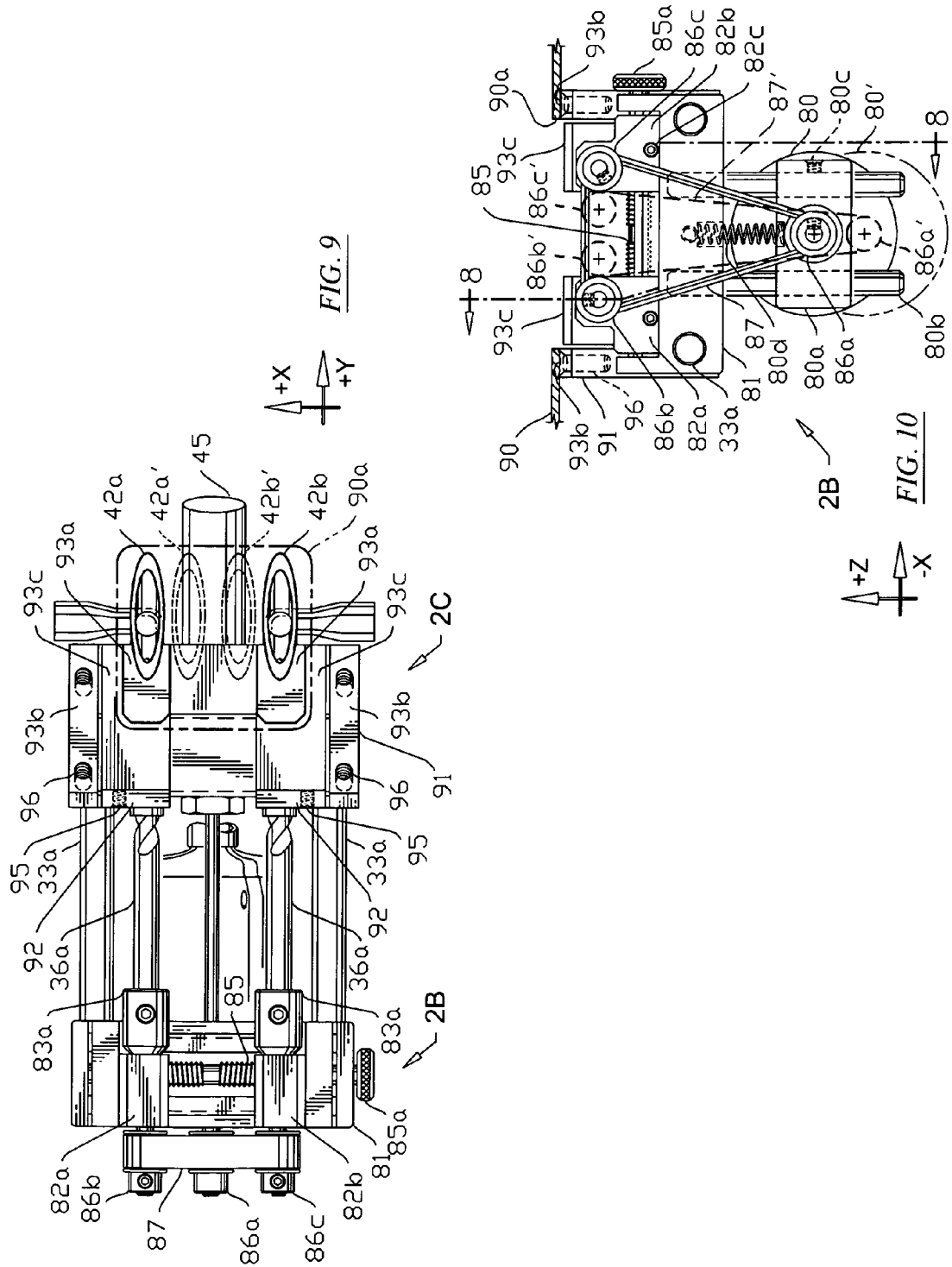
FIG. 9 is a top view taken along the line 9-9 of FIG. 8, showing the drilling module 2B and the guide module 2C without a removable plate and a main plate.
FIG. 10 is a front view taken along the line 10-10 of FIG. 8, showing two driven pulleys connected to a drive pulley by a belt in the drilling module 2B.

The pocket-hole drilling implement in exemplary embodiments according to the present invention provides: efficiency, ease of use, quickness in application by introduction of a workpiece sensor/initiation switch when a workpiece is placed, which replaces a foot or a hand operated switch; capability to handle different thickness of a workpiece by a movable stop fence that adjusts the drilling depth; safety to prevent human finger injury by a short stroke clamping actuator; the assurance of not drilling pocket-holes on the sidewall of a workpiece by a W-shaped plunger 57 that is disposed inside of a fence 50 and an initiation switch 52 mounted therein; a clamp pad sized to the width of pocket-holes or the diameter of a step-drill to prevent drilling pocket-hole on the sidewall of a workpiece; a blower or an ejector pump to remove wood chips; the ability to drill two pocket-holes into a workpiece where a user can adjust the pocket-hole spacing in-between; the ability to drill multiple pocket-holes into a wide workpiece in one setup by detachably mounted drilling/guide modules on a rail that is at a right angle with respect to the drilling direction; the ability to drill at least two dowel-holes on the edge of a board that is to be joined to a side panel in addition to multiple pocket-hole drilling; extended usage/life of a step-drill by having a clearance in a drill guide bore for the cutting edges of a major diameter of the step-drill; and a lever or a secondary electric motor that eliminates the use of shop air to operate the machine.

In order to aid in understanding the description, the following definitions are suggested: the longitudinal direction is identical to the Y'-direction; the drilling direction is identical to the Y-direction; the lateral direction is identical to the X-direction; the front is identical to the −Y'-direction; the rear is identical to the +Y'-direction; and the vertical direction is identical to the Z'-direction. The angle between the Y-direction and Y'-direction is approximately 15 degrees.

A pocket-hole drilling implement 1 (or a body thereof) in a first exemplary embodiment according to the present invention is illustrated in FIGS. 1 through 6. FIGS. 1 and 2B show a body 1, a frame 1A, a drilling module 1B, a guide module 1C, a fence module 1D and a clamping module 1E as a top and a side cross-sectional view, respectively. FIG. 2B shows a step-drill 36 rigidly mounted on an output shaft 37 of the motor 30, and the guide block 40 that has a clearance bore formed therein without a drill guide. FIG. 3 shows a top view of the drilling module 1B, the guide module 1C, and the positional relationships of a bar tie 34 locations "I" and "II". FIG. 4 shows a front view of the clamping module 1E and the fence module 1D. FIG. 5 shows a top view of the positional relationships among a first workpiece 20 with a drilled pocket-hole 21, an actuation plunger 57, an initiation switch 52, a clamp pad 74, and a step-drill 36, a fence module 1D without its cover 51a, and a turret 60. FIG. 6 shows a cross-sectional front view of the guide module 1C.

As shown in FIGS. 1 through 6, the body 1 may include a generally rectangular shaped frame 1A, a removable plate 25, a work surface or a main plate 24, a drilling module 1B, a guide module 1C, a fence module 1D and a clamping module 1E. Two plates 25 and 24 may be fastened onto a flange portion of the frame 1A. The drilling module 1B may include a motor 30, a gear box 31, a motor bracket 32, two guide bars 33, a bar tie 34, a lateral coupling 35 and a step-drill 36. The guide module 1C may include a guide block 40, two guides 40a, a drill guide 42, a linear actuator such as air cylinder 45, a home switch 46, and a chip remover 44, which may be mounted onto the main plate 24 by fasteners 27. The fence module 1D may include a fence 50, an initiation switch 52, a L-bracket 53, two fasteners 54 that hold the fence 50 and the L-bracket 53, and two fasteners 61 that connect fence extensions 55 and turrets 60 onto a reinforcement plate 24a. The clamping module 1E may include a clamp bracket 70, fasteners 71 to mount the clamp bracket 70 onto the main plate 24, a clamping actuator such as air cylinder 72, a pad 74, and a fastener 73 that secure the air cylinder 72 in the clamp bracket 70.

As shown in FIGS. 1, 2A, 3, and 6, an electric or air motor 30 may be mounted on the motor bracket 32 and transmits rotational torque to right angle gears in gear box 31, which rotates the step-drill 36. The right angle output shaft from the gear box 31 provides a shorter length of the motor 60 in the Y-direction and the capability to mount the step-drill 36 rigidly thereon. A lateral coupling 35 may be disposed in between the step-drill 36 and the output shaft from gear box 31 to compensate lateral/angular misalignment for the step-drill 36 between the output shaft from the gear box 31 and the drill guide 42 in the drilling module 1C.

Two guide bars 33 may be attached to the motor bracket 32 at one end (−Y) and to the bar tie 34 at the other end (+Y), which may be slidably mounted onto two guides 40a that is disposed in the guide block 40. An initiation switch 52 is disposed inside of the fence 50 so that its urge with a workpiece 20 causes the following sequences: 1) actuation of clamp air cylinder 72 to secure workpiece by the pad 74; 2) turning the motor 30 power "on" at home position "I"; 3) movement (+Y) of the drilling module 1B by the air cylinder 45 toward end position "II" while cutting a pocket-hole 21 in workpiece (home position of bar tie 34 is indicated as "I" shown in full lines and forwarded end position of the bar tie 34' is indicated as "II" shown in dashed lines); 4) reverse movement (−Y) of the module 1B after the bar tie 34 contacts with the reversing switch 47; 5) turning the motor power "off" at position "I" after the bar tie 34 urges with the home switch 46, and 6) releasing the pad 74 from the workpiece and finishing one drilling cycle. The axis (Y) of the drilling module 1B movement and its step-drill intersect the main plate 24 at approximately 15 degrees.

Figure 11:
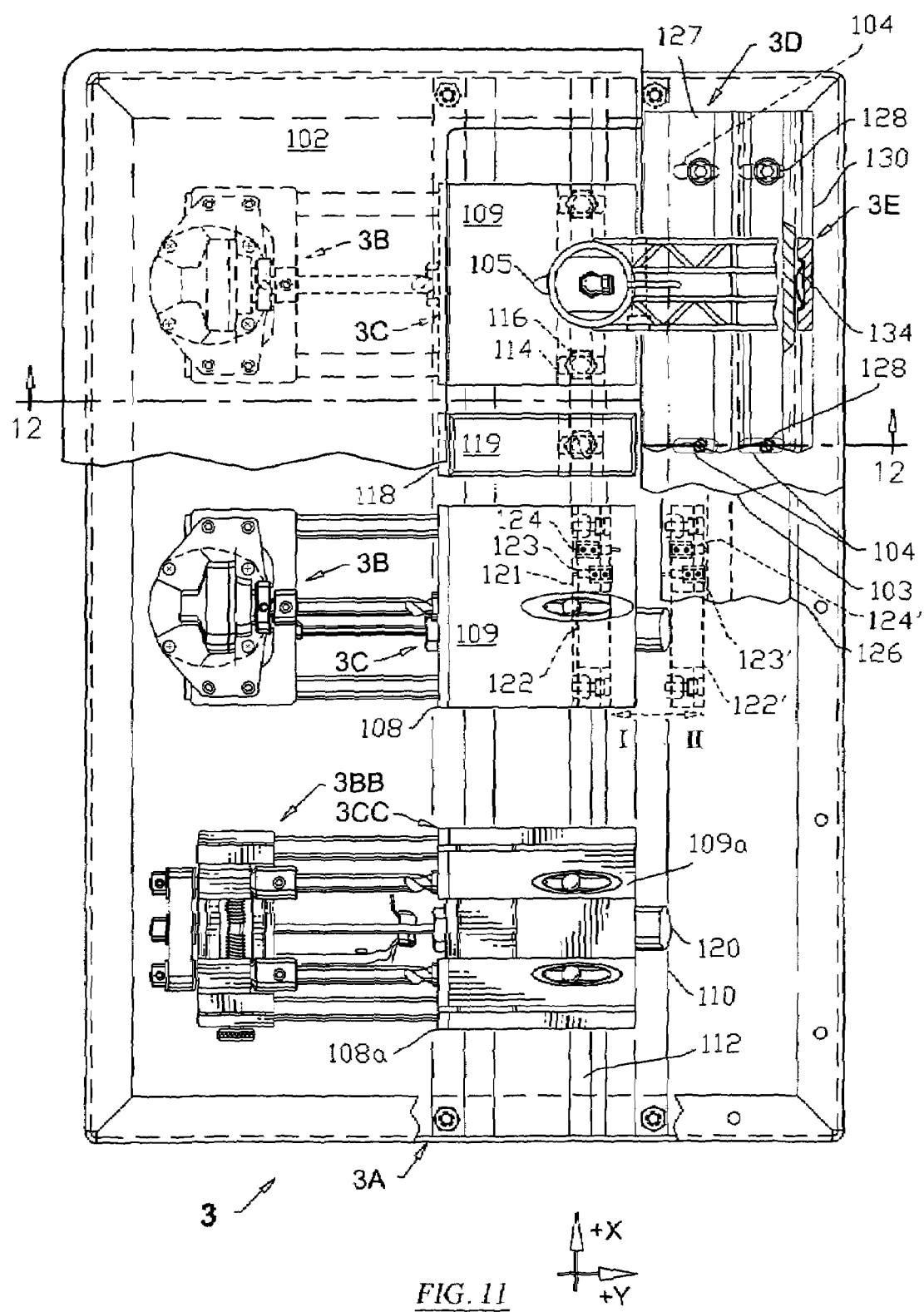
FIG. 11 is a top view of a third exemplary embodiment 3 of a multiple pocket-hole drilling implement in accordance with the present invention, showing two unit modules that consist of a drilling module 3B and a guide module 3C, a standoff, a unit module 3BB and 3CC, which are mounted on a rail.
Figures 12, 13:
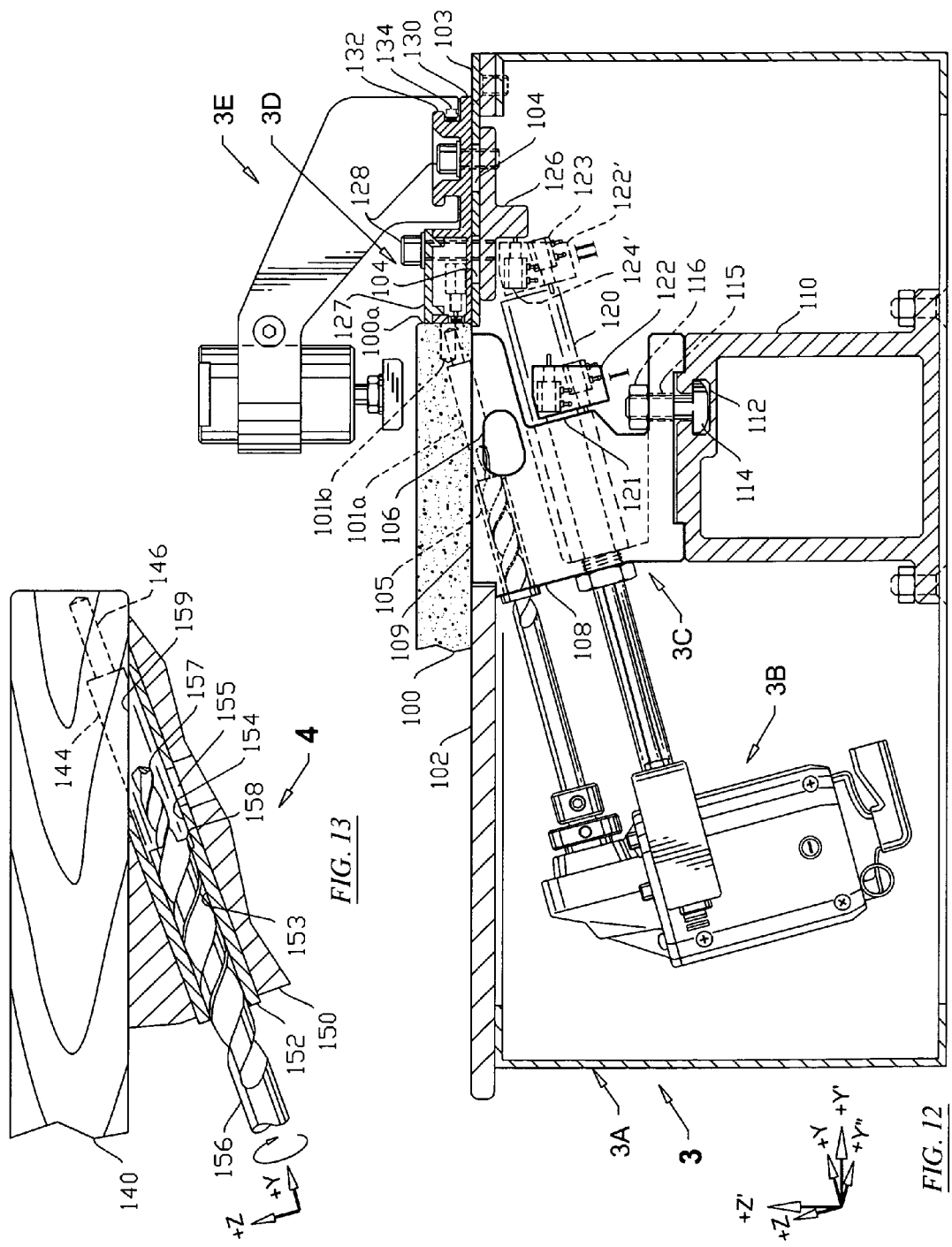
FIG. 12 is an enlarged side cross-sectional view taken along the line 12-12 of FIG. 11, showing that the drilling module 3B and the guide module 3C are detachably mounted on a mounting structure, a fence module 3D is mounted on the top of a main plate, and a clamping module 3E is mounted on a rail that is an extension formed in the fence module 3D.
FIG. 13 is an enlarged side cross-sectional view of a fourth exemplary embodiment 4 of a drill guide implement in accordance with the present invention, showing the relationship between a step-drill and the drill guide that has a radial clearance for the cutting edges of the major diameter of a step-drill.

The home switch 46 and reversing switch 47 are mounted on the guide block 40 and L-bracket 53, respectively, but they may be mounted on the bar tie 34 to function the same as above, which is demonstrated in FIGS. 11 and 12.

Therefore, introduction of a sensor/initiation switch 52 enables drilling a pocket-hole into a workpiece with greater efficiency, ease of use, and speed in application, which eliminates use of a foot or hand operated switch.

As shown in FIGS. 1, 2A, 3, and 5, two longitudinal through slots 28 may be formed in the main plate 24 to fasten the L-bracket 53 to the fence 50 by two fasteners 54, which enables the fence 50 and L-bracket 53 to move together longitudinally when fasteners 54 are loosened.

The fence 50 may have two extensions 55 and there are two longitudinal through slots 56 formed in fence rear 51d (+Y'). A gauging structure such as a turret 60 may be positioned above the fence rear 51d and may be secured to the plates 24 and 24a by the fastener 61. A simple screw that is movable about a nut mounted on the main plate 24 may replace the turret 60.

The turret 60 may have four stop fences 63, 64, 65 and 66 corresponding to workpiece thickness, which are also illustrated as "1 (½)", "2 (⅝)", "3 (¾)" and "4 (+1)", numeric notes, on top. The distance between the center of fastener 61 and each of four stop fences 63, 64, 65 and 66 is selected to position the longitudinal placement of the workpiece against fence face 51b. As an example, FIGS. 1 and 2A show the pocket-hole drilling in a 25 mm (1 inch) thick workpiece. To drill a pocket-hole in a 13 mm (½ inch) thick workpiece, loosen fasteners 54 and 61, move the fence 50 in the −Y'-direction, rotate turrets 60 180 degrees, move the fence in the +Y'-direction for the fence rear 51d to urge with the stop face 63, fasten fasteners 54 and 61 to lock the position of fence and L-bracket, then lower the air cylinder 72 to reach the pad 74 approximately 5 mm (3/16 inch) above workpiece by loosening and tightening fastener 73.

Alternatively, the vertical adjustment of the pad 74 and the air cylinder 72 according to the thickness of workpiece may be achieved by having two rods mounted on the main plate 24 and by having two bores formed in the clamp bracket 70 at the same position where there are fasteners 71, wherein the location of two bores are corresponding to the location of the two rods and the two bores are sized to slide on the rods.

Therefore, the depth of a pocket-hole in a workpiece corresponding to its thickness can be achieved automatically by longitudinal adjustment of the fence module 1D.

As shown in FIGS. 4 and 5, the W-shaped plunger 57 may be placed inside of fence 50 and an initiation switch 52 disposed thereafter. The W-shaped plunger 57 may have two wings 57d and a central recess 57c in between two actuator tips 57a and 57b that may extend beyond fence face 51b in the −Y-direction to be able to engage with an edge-wall 20c of workpiece 20. A drilled pocket-hole 21 is shown in a dashed line and is located close to sidewall 20a. FIG. 5 shows that edge-wall 20c is placed against fence face 51b, which causes one tip 57a to move backward (+Y') to a new position 57a' and is shown in a dashed line for the W-shaped plunger 57', which may not be able to activate the initiation switch 52 that may set to activate only when both tips 57a and 57b move backward together.

A full movement of both tips 57a and 57b, which causes an actuation of switch 52 movement in the −Y-direction by urge with the workpiece 20 may result in generation of drilling a pocket-hole inside of sidewall 20b. This may take place only when the workpiece is placed above the angularly truncated side inner bore of the drill guide 42 or above the major diameter of the step-drill 36. This also may be achieved by two tips 57a and 57b that activate the initiation switch 52 or by having two separate initiation switches 52. The initiation switch 52 may comprise a pneumatic switch, an electric contact switch, an electronic non-contact switch, and a mechanical switch.

The width of pad 74 may be sized to be substantially the same as that of major diameter of step-drill 36, which may help a user place workpiece in proper lateral location (X-direction) for drilling pocket-holes as shown in FIG. 4. Pad 74 may be mounted on non-rotating rod of an air cylinder 72. Often a user's finger placed in-between top of workpiece 20 and underneath pad 74 may cause finger injury if the stroke of a clamping actuator is more than 14.3 mm (⅜ inch), which may be prevented by limiting the stroke of a clamping actuator.

Therefore, positioning and drilling a pocket-hole within a workpiece sidewall can be achieved by the use of two tips 57a and 57b, or by use of the pad 74 whose lateral width is substantially the same as the step-drill diameter. Also, use of 14.3 mm (⅜ inch) or shorter stroke air cylinder for clamping a workpiece may prevent finger injury to the user.

It is found in practice that the heat treated harden steel drill guide 42 may be eliminated from the guide block 40 by increasing bending strength of the step-drill and/or by firmly mounting the step drill on the output spindle of the motor. As shown in FIG. 2B, the step-drill 36 may be firmly mounted on a hollow output spindle 37 by a split-collet/chuck 38a and an additional split-sleeve/chuck 38b to resist a lateral load from the workpiece. The guide block 40 may have a clearance bore 41 corresponding to the shape of the step-drill 36. Also, the removal and mounting the step-drill 36 are easy with the tubular output shaft 37.

Figure 15:
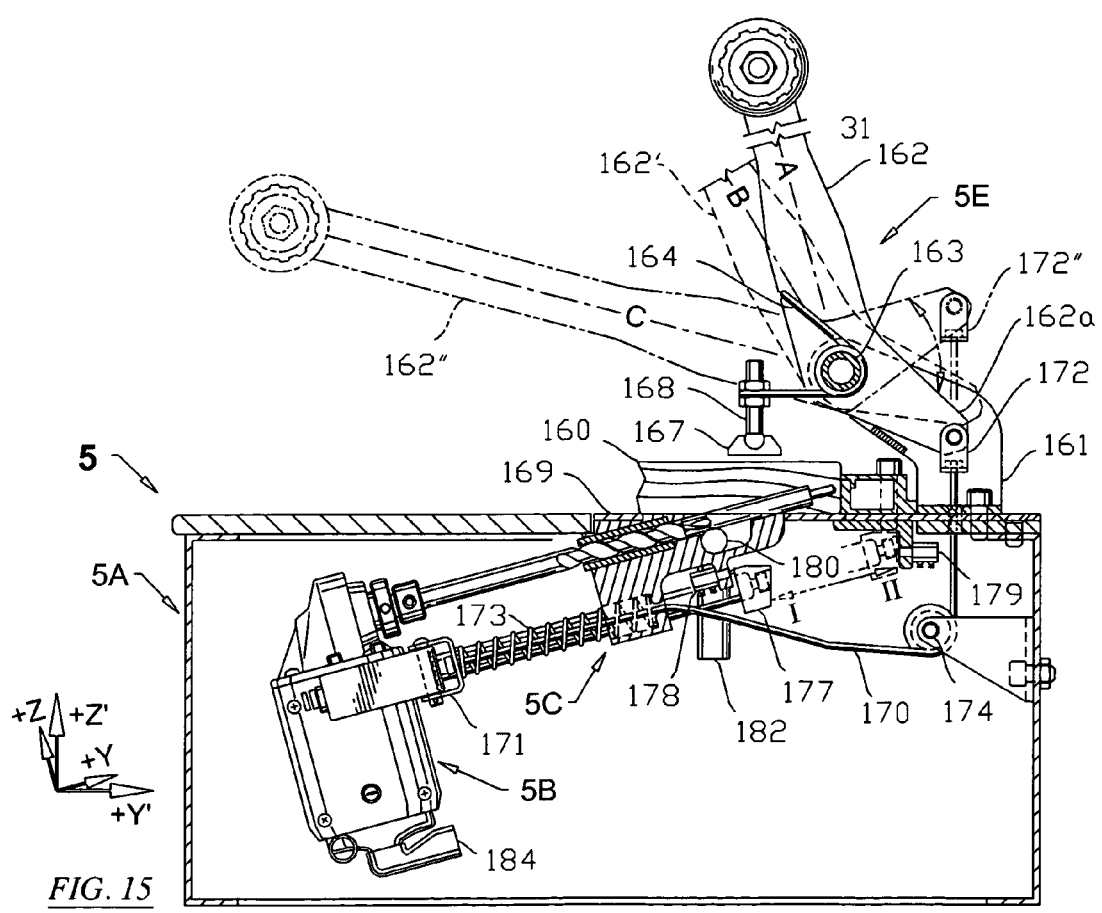
FIG. 15 is a side sectional view of FIG. 14, with parts broken away substantially along the centerline of the drill guide and partial view of the clamp bracket.

As shown in FIGS. 2A, 3 and 6, a wood chip remover 44 coupled with a blower 39 may help to remove chips that are generated from cutting a pocket-hole 21. The blower 39 may be disposed in the motor 30 and an impeller 39c may be mounted onto the motor shaft, which generates vacuum to pull chips from the chip exit 44c to the blower entrance 39a. As the motor turns on, wood chips generated from the drill 36 advancement (+Y) are pulled through chip holes 43 and the chip exit 44c, enters the blower entrance 39a, are thrown out of the blower exit 39b by the centrifugal force from an impeller 39c, and may be collected into a bag (not shown). There may be flexible tubing connected from the chip exit 44c to the blower entrance 39a and from the blower exit 39b to the bag. FIGS. 1, 3 and 6 show that the air cylinder 45 is positioned off center in between two guides 40a for a vertical chip exit 44d to be disposed under the chip hole 43 for easy chip removal. This is also shown in FIG. 15 where a lateral chip exit 180 and a vertical chip exit 182 are disposed in the guide module 5C. Wood chips may be pulled from either chip exit 180 or 182 to the blower inlet 184.

An alternative is that an ejector pump may be installed near frame 1A, in between an air-inlet 44a and the chip exit 44c or near the chip hole 43. The air to the ejector pump may be supplied by the blower 39 that is disposed in electric motor 30, by exhaust air from an air motor if air motor is used for the electric motor, or by shop air.

Therefore, wood chips generated from drilling a workpiece can be removed efficiently and effectively from body 1 by the blower or by the ejector pump.

A pocket-hole drilling implement 2 (or a body thereof) in a second exemplary embodiment according to the present invention is illustrated in FIGS. 7 through 10.

FIG. 7 shows two pocket-holes 22a and 22b that are drilled in a relatively narrow in width workpiece 22, which is typically used in attaching a rail to a stile of a cabinet or a leg of a table. A user may select the distance between two pocket-holes according to the width of a workpiece and drill two holes simultaneously and efficiently by use of this body 2.

FIG. 8 shows a body 2, a frame 2A, a dual drilling module 2B, a dual guide module 2C, a fence module 2D and a clamping module 2E.

FIG. 9 shows the dual drilling module 2B and the dual drilling module 2B without removable plate 89 and a main plate 90. A cutout 90a is shown in a double-dashed line, which is formed in the main plate 90 for the clearance for two upper surfaces 93a whose vertical elevation are the same as the main plate 90, which is also shown in FIG. 8.

FIG. 10 shows the dual drilling module 2B with details of two driven pulleys 86b and 86c that are connected to a drive pulley 86a by a belt 87 and two drill holders 82a and 82b that are connected by a screw 85 in the drilling module 2B.

The apparatus and functionality of frame 2A, fence module 2D, clamping module 2E, the wood chip removal, the bar tie 34 and the L-bracket 53 coupled with the air cylinder 45 in FIG. 8 of this second exemplary pocket-hole drilling implement 2 are the very same as the first exemplary pocket-hole drilling implement 1 in FIG. 2.

As shown in FIGS. 8 through 10, an electric or air motor 80 may be mounted parallel to the drilling direction on a motor bracket 80a and transmit rotational torque from a pulley 86a that is attached to motor shaft to two driven pulleys 86b and 86c by a belt 87, which rotates step-drills 36a and 36b. Two drill holders 82a and 82b may move closer to or farther from each other by an arrangement of a right-hand and left-hand screw 85 and by rotation of a knob 85a, which may be slidably mounted on one pair of first guide way 84 that are disposed in the lateral direction (X-axis) in between the drilling block 81 and the drill holders 82a and 82b.

The drill adapter 83a is rotatively coupled to radial bearings that are mounted in the drill holder 82a; has a driven pulley 86b attached on one end (−Y), and has an inner bore at the other end (+Y) to fasten the shank of a step-drill 36a. Two step-drills 36a and 36b that may be securely mounted in the drill adapters 83a and 83b, and also they are guided by two drill guides 42a and 42b, respectively. Two guide bars 33a may be mounted to motor bracket 32 at one end (−Y) and to bar tie 34 at the other end (+Y), which may be slidably mounted onto two guide bushings that are disposed in guide block 91.

The shuttle movement of drilling module 2B in the longitudinal direction may be carried by air cylinder 45, which is initiated by the initiation switch and is controlled by the home and reversing switches as demonstrated in the body 1.

The guide block 91 may have two opposite upper surfaces 93a on which threaded holes are formed to be mounted underneath main plate 90 by plural fasteners 96.

Two guide adapters 92 may be slidably mounted on one pair of second guide way 94 that are disposed in the lateral direction (X-axis) in between two opposite upper surfaces 93a of guide block 91, and may move laterally to follow as drill holders 82a and 82b move closer to or farther from each other, which may be locked to their positions by fastening set screw 95 that is disposed in guide adapters 92. Each guide adapter 92 may have an upper surface 93a whose vertical elevation is the same as the main plate 90 and an angularly truncated surface of the drill guide 42a, and a second surface 93b that provides clearance underneath the main plate 90.

Lateral distance between two step-drills 36a may be adjusted by movement of the two drill holders 82a and 82b, by turning the knob 85a, which is shown in dashed lines after adjustment for the position of two driven pulleys 86b', belt 87', drive pulley 86a' and motor 80'. When the distance between two pulleys 86b and 86c get closer, the position of the drive pulley 86a' moves downwardly (−Z) to maintain the tension of the belt 87, which may be set by a spring 80d disposed in between the drilling block 81 and motor bracket 80a.

Once an adjustment is being performed, the following may takes place prior to drilling: fasten set screw 80c to lock the bracket 80a onto guide 80b, fasten set screws 82c to lock the drill holder 82a and 82b onto the drilling block 81, and fasten set screws 95 to lock the guide adapters 92 onto the guide block 91. Thus, the lateral position of drill guides 42a and 42b is shown in full lines for a wider space in-between and that of drill guides 42a' and 42b' is shown in dashed lines for a narrower space in-between in FIG. 9; the distance between the drill guides 42a and 42b or two pulleys 86b and 86c is 50.8 mm (2.0 inch), and that of 42a' and 42b' or two pulleys 86b' and 86c' is 17.5 mm (0.69 inch), wherein the diameter of step-drill is 9.5 mm (0.38 inch).

Another approach to provide two drilling capability with one motor is to dispose two separate bars whose one ends of both bars are mounted on the pivot of the motor 80 shaft and the other ends of each bars are mounted on the pivot of drill adapters 83a and 83b, wherein the distances between the motor and each drill adapters are fixed. Two separate belts may connect two pulleys connected in series on the motor 80 shaft to two separate driven pulleys 86b and 86c to transmit the rotational torque from a motor to each driven pulley, which may not require adjusting belt tension or need having the spring 80d.

Therefore, the lateral adjustability of the two drill guide adapters that are slidably mounted in a base or a block with or without provision of space adjustment capability between two drill guide adapters may enable a user to select the distance between two pocket-holes.

A pocket-hole drilling implement 3 (or a body thereof) in a third exemplary embodiment according to the present invention is illustrated in FIGS. 11 and 12. FIG. 11 is a top view with a main plate 103 and a removable plate 102 partially broken and shows the body 3, a frame 3A, two unit modules 3B and 3C, a unit module 3BB and 3CC, a standoff 118, a fence module, and a clamping module 3E in a frame 3A. FIG. 12 is a cross-sectional view taken along the line 12-12 of FIG. 11 and shows body 3, a frame 3A, the drilling module 3B and the guide module 3C that may be detachably mounted on a mounting structure 110, which includes a pair of bars, a fence module 3D that may be slidably mounted on top of main plate 103 and a T-bracket 126, and a clamping module 3E that may be mounted on a rail 130 that is an extension formed in the fence module 3D. A unit module may include a drilling module and a guide module thereafter.

The apparatus and functionality of this third exemplary pocket-hole drilling implement 3 may be very similar to the first exemplary pocket-hole drilling implement 1 and the second exemplary pocket-hole drilling implement 2; especially the functionality of the unit modules 3B/3C and 3BB/3CC are the same as described in the body 1 and the body 2, respectively.

As shown in FIGS. 11 and 12, the frame 3A may be laterally (X-axis) wider in length than its longitudinal direction to accommodate a wider workpiece and to drill multiple pocket-holes in one setup. A mounting structure 110 is disposed laterally in the frame 3A and may form a T-channel to accept the head of drop-in-and-turn T-bolts 114 within. The lower end (−Z') of a guide block 108 and a standoff 118 may have through holes 115 to accept T-bolts 114 and may be slidably and laterally positioned by a tongue and groove arrangement with the mounting structure 110, which may be locked by fastening T-bolts 114 and nuts 116.

To provide for a user to select a plurality of units to be mounted on and demounted from the mounting structure 110, the following provision/changes may be made to be functional as an independent portable unit module: the mounting structure 110 may be disposed laterally in the frame 3A to mount unit modules; the guide module 3C/3CC may have a stop surface 121 to engage with a home switch 123; the home switch 123 and a reversing switch 124 may be mounted in a bar tie 122 that is a part of the drilling module 3B/3BB; the removable plate 102 may provide a clearance opening(s) for guide block top surfaces 109/109a and standoff top surface 119; a substantially long T-bracket 126 may be disposed underneath the main plate 103 to engage with the reversing switch 124 and the bar tie 122 and also to serve as mounting means for the rail 130.

A rail 130 may have a U-shaped channel to serve as a fence module 3D at its front half (−Y'), a set of opposing tongues 132 to mount clamping module 3E at its rear half (+Y'), and plural through holes for fasteners 128 therein. The fence module 3D may have at least one actuation switch inside of the U-shaped channel and a cover 127 thereon. A leaf spring 134 may be disposed at near tongue/grove 132 to resist free lateral movement of the clamping module 3E. The main plate may have plural through slots 104 formed longitudinally (Y'-axis) through which fasteners 128 may connect the rail 130 to the T-bracket 126, which enables the rail 130 and the T-bracket 126 to move/adjust together according to the thickness of workpiece.

Thus, the drilling/retraction operations can be made as stated in body 1 and this is generally shown as position "I" and "II". The top surfaces 109, 109a and 119 provide substantially the same vertical (+Z') elevation as the plates 102 and 103, which enables a user to place/move a workpiece without difficulty. The mounting structure 110, guide block 108 with chip hole 106, T-bracket 126, cover 127 and rail 130 may be made of extruded aluminum whose cross-sections may be built similar to those as shown in FIG. 12.

Even though individual actuator mounted on each guide module 3C or 3CC carries the movement of each drilling module 3B or 3BB, this may be carried by an actuator mounted on one of guide module 3C or on the mounting structure 110.

Therefore, a user can select the number of unit modules for the multiple pocket-hole drilling in a relatively wide workpiece in a set up, wherein each unit module is portable and easy to mount/demount on/from the rail.

High production case goods, both knockdown (KD) and pre-assembled furniture, use a set of rotating cam and dowel to lock a face board and a side panel together. The face board uses 16 mm or 19 mm holes on one side of major surfaces for the cam and 8 mm dowel-holes from edge-wall, which requires drillings from two directions. Use of the pocket-hole can be as efficient as the cam and dowel set if at least two dowel-holes can be drilled from the edge-wall of the face board while drilling the pocket-holes simultaneously. The number of pocket-holes can be arbitrary, but two dowels that are placed across the width of the board can be served not only for the alignment of the board and the panel prior to driving screws from the board onto the panel but also for the load carrying purpose.

A wide workpiece 100 may have pocket-holes 100a on its major surface by the drilling module 3B and at least two dowel-holes 101b on the edge-wall 101a in the ±X-direction by two dowel drillers (not shown) that are slidable in the ±Y'-direction as shown in FIG. 12. The dowel drillers may be mounted on the main plate 103.

Therefore, in one set up, the body 3 can drill numerous pocket-holes on the face and dowel-holes from the edge-wall of a board.

In the practice of my invention, the pocket-hole drilling implement 3 may extend and apply its merits to the implement 1 and 2; the guide module 1C or 2C may be mounted on the mounting structure 110 instead of being mounted on the main plate 24 or 90; the guide module 1C or 2C may be made of extruded aluminum with the chip exit 44c formed within; the rail 130 may be used to mount the clamping module 1E; the T-bracket 126 may replace the L-bracket 53, and both the home switch 46 and reversing switch 47 may be mounted on the bar tie 34.

Similarly, a popular 32 mm (center to center dowel drilling or) boring head can be mounted on the mounting structure 110 to drill a plurality of pocket-holes as shown in FIG. 12. The boring head that has a plurality of spindle may be called hereafter as the drilling module 3B, and user may choose a number of step-drills to mount on selected spindles. Due to the rigidity of the boring spindle, this boring head may not need to have the guide module 3C to guide the step-drill. Therefore, utilization of the commercially available boring head with the adjustable fence module 3D may achieve effective drilling on a wide board requiring a plurality of pocket-holes in one setup.

In the present form of the invention, however, the mounting structure 110, drilling module 3B, guide module 3C, and the boring head may be invertedly mounted above the plates 102 and 103 so that the top surface does not need any cutout. An inverted mount configuration is easier to mount, remove, maintain and adjust modules 3B, 3BB, 3C and 3CC than modules mounted under the top surface as shown in FIG. 12. Furthermore, the vertical movement (+Z) of the mounting structure 110 may eliminate the need of clamping module 3E because the down position (−Z) of the mounting structure 110 may hold the workpiece in place. The drilling direction for this inverted configuration is +Y"-direction as indicated in FIG. 12.

A pocket-hole drilling implement 4 (or a body thereof) in a fourth exemplary embodiment according to the present invention is illustrated in FIG. 13 as a side cross-sectional view. As shown in FIG. 13, a workpiece 140 is placed above a guide block 150 in which a drill guide 152 is disposed, and the cutting edges 158 of a step-drill 156 is positioned beyond the major bore 153 in the +Y-direction, which shows at rest position of the step-drill 156 prior to drilling. The drill guide 152 may comprise a first or major bore 153, a second or enlarged bore 154, a chip hole 155 and a truncated exit 159. The step-drill 156 has major diameter cutting edges 158 for a pocket hole 144 and a pilot drill 157 thereafter for a pilot hole 146. When the step-drill 156 starts and repeats cutting/advancing into a workpiece 140, and is subject to a lateral load from a workpiece in the −Z-direction, it may cause the cutting edges 158 subject to wear by its friction with the first bore 153. To extend the life of the step-drill, the second bore 154 for the clearance for the cutting edges 158 is formed in the drill guide 152.

This also may be implemented by providing a cylindrical shape drill guide 152 that terminates its one end in the −Y-direction to avoid contacting with the cutting edges 158. The exit bore 154 may be formed in the guide block 150 that is made of soft material such as aluminum or thermoplastic, wherein the drill guide 152 is made of hardened steel material.

Therefore, the provision of the clearance formed in the drill guide or use a longitudinally short drill guide that avoids contacting with the cutting edges of the step-drill may extend the life of the step-drill.

Figure 14:
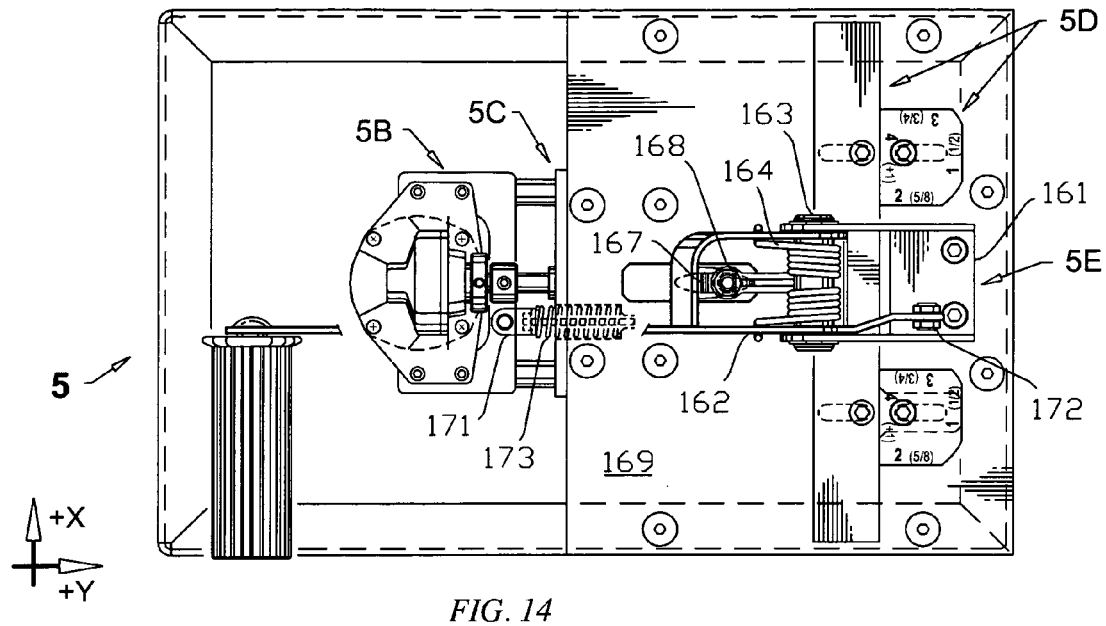
FIG. 14 is a top view of a fifth exemplary embodiment 5 of a pocket-hole drilling implement in accordance with the present invention, showing a frame 5A without a removable plate, a drilling module 5B, a guide module 5C, a fence module 5D and an actuation module 5E.

A pocket-hole drilling implement 5 (or a body thereof) in a fifth exemplary embodiment according to the present invention is illustrated in FIGS. 14 and 15. FIG. 14 shows a body 5, a frame 5A, a drilling module 5B, a guide module 5C and an actuation module 5E. FIG. 12 is a side sectional view, with parts broken away substantially along the centerline of the drill guide and partial view of the clamp bracket 161. The apparatus and functionality of this fifth exemplary pocket-hole drilling implement 5 may be very similar to the first exemplary pocket-hole drilling implement 1.

As shown in FIGS. 14 and 15, the drilling module 5B may be slidably mounted on the guide module 5C. The actuation module 5E may include a bracket 161, a lever 162, a pivot pin 163, a torsion spring 164, a swivel pad 167, a thread rod 168, a steel wire cable 170, a first cable tie 171, a second cable tie 172, a compression spring 173, and a cable bracket pulley 174.

The bracket 161 is mounted on a main plate 169 and has two extensions (+Z' and −Y' in FIG. 15) on which the pivot pin 163 is mounted laterally in the X-direction. A double torsion, spring 164 and the hand lever 162 are rotatively coupled on the pivot pin 163. Two ends of the torsion spring 164 may be secured to the lever 162 and may form an extension at its middle to mount the pad 167. A first cable tie 171 and a second tie 172 may be attached to a motor bracket in the drilling module 5B and a lever rear 162a, respectively, and the wire cable 170 in-between both ties 171 and 172 may be guided by a bracket pulley 174. A cable casing that is fixed on the guide block 5C and the bracket 161 to guide the wire cable 170 may replace the bracket pulley 174.

The lever 162 may rotate on the pivot pin 163 from at rest or a first point 'A' (162) shown in full lines in FIG. 15 to a clamping or a second point 'B' (162') shown in dashed lines and to the end of drilling or a third point 'C' (162") shown in double-dashed lines therein. When the lever 162 is pulled in the −Y'-direction from at rest or the first point 'A' to the second point 'B', the swivel clamp 167 may engage/secure a workpiece 160 onto the main plate 169. Further rotation of the lever 162 in the −Y'-direction from the second point 'B' to a third point 'C' may pull the drilling module 5B in the drilling direction (+Y) to turn motor power "ON" as a bar tie 177 separates from a home switch 178 at home or rest position "I" and reaches to the end of drilling stroke or an end position "II". Reverse (+Y) rotation of lever 162 from the point 'C' to 'B' may cause the drilling module 5B to move in the −Y-direction by a compression spring 173 and turns motor power "OFF" as the bar tie 177 urges the home switch 178. As the lever 162 rotates from the point 'B' to 'A', the pad 167 releases to move the workpiece.

The pad 167 may be attached to a thread rod 168, which may be adjusted by its vertical position (±Z') according to the thickness of a workpiece. A cam may replace the torsion spring 164. This cam can be configured not to require any further rotational force after clamping the workpiece 160 as the lever 162 rotates between positions 'B' and 'C.' The torque of the spring 164 increases as it is being rotated.

It is practical to use this pocket-hole drilling machine with electricity and without shop air because electricity is more readily available, much less expensive to run, and quieter than the compressed air. The function of the lever 162 can be replaced by a secondary electric motor that has built-in speed reduction gearings and thrust nut/screw manipulations, which provides high thrust force or torque to clamp a workpiece 160 in addition to pulling the cable 170 for the drilling module 5B to drill a pocket-hole. This secondary motor, not shown, may be mounted on the frame 5A.

Therefore, the use of a lever or a secondary electric motor for the actuation of the clamping and drilling movement enables body 5 to eliminate use of shop air to operate this pocket-hole drilling implement.

Even though the exemplary embodiments 1, 2, 3 and 5 are illustrated based on the use of electric motors for the drilling modules 1B, 2B, 3B, 3BB and 5B, continuous operations or certain circumstances may require using air motors. Utilization of the reversing switches 47 as shown in FIGS. 2A and 3 not only enables the reverse movement of the air motor 30, but also shuts the air supply when it reaches at end of drilling position II to save the compressed air consumption.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

What is claimed is:

1. An apparatus for drilling pocket-holes into a workpiece for use cooperatively with a step-drill, comprising:
   a body, said body having a work surface defining a plane;
   a drilling module for cutting the pocket-hole, said drilling module having a motor for driving the step-drill, wherein said drilling module is movable in a drilling direction from a first position to a second position by an actuator, wherein the step-drill intersects said plane;
   a fence mounted on said work surface at substantially a right angle with respect to said drilling direction to position a workpiece; and
   at least one switch disposed on said work surface and having a relationship with the workpiece so as to cause the said actuator to move said drilling module when the workpiece urges said switch.

2. The apparatus as claimed in claim 1, wherein said switch is disposed in said fence.

3. The apparatus as claimed in claim 2, further comprising two actuator tips having a relationship with said switch, wherein the distance between said two actuator tips is sized to activate said switch when the workpiece is placed to urge both said tips to prevent drilling the pocket-hole on the sidewall of the workpiece.

4. The apparatus as claimed in claim 1, wherein said switch is selected from the group consisting of a pneumatic switch, an electric contact switch, an electronic non-contact switch, and a mechanical switch.

5. An apparatus for drilling pocket-holes into a workpiece for use cooperatively with a step drill, comprising:
   a body, said body having a work surface defining a plane;
   a drilling module for cutting the pocket-hole, said drilling module having a first motor for driving a step-drill, wherein said drilling module is movable in a drilling direction from a first position to a second position by an actuator, wherein the step-drill intersects said plane;
   a guide module, said drilling module slidably mounted thereon, said drilling module engaging with respect to said guide module in said drilling direction; and
   an adjustable fence mounted on said work surface to position the workpiece so that the depth of drilling can be adjustable.

6. The apparatus as claimed in claim 5, further comprising at least one gauging structure mounted on said work surface, wherein said gauging structure is movable with respect to said work surface to adjust the distance of said fence from said gauging structure.

7. The apparatus as claimed in claim 5, further comprising a switch disposed in said fence so as to cause the said actuator to move said drilling module by said actuator when the workpiece urges said switch.

8. The apparatus as claimed in claim 5, further comprising a hollow output spindle disposed in said first motor so as to mount the step-drill.

9. The apparatus as claimed in claim 5, further comprising a drill guide disposed within said guide module to guide the step-drill, wherein a first bore and a second bore formed coaxially in said drill guide, said first bore being sized to fit the step-drill and said second bore being positioned in a direction toward said plane, wherein said second bore is formed by at least one of a substantial clearance with respect to the step-drill, and a softer material than that of said first bore so as to minimize wear on edges of the step-drill.

10. The apparatus as claimed in claim 5, further comprising a drill guide disposed within said guide module to guide the step-drill, and a lateral coupling disposed between an output shaft of said first motor and the step-drill so as to compensate misalignment of said step-drill with respect to said drill guide.

11. The apparatus as claimed in claim 5, further comprising a chip remover disposed in said body to remove wood chips generated from workpiece drilling by the step-drill, wherein at least one chip hole is formed within said guide module to connect to said chip remover.

12. The apparatus as claimed in claim 11, wherein the wood chips are removed by at least one of a blower, and an ejector pump, wherein said blower is attached to a motor, wherein said ejector pump is disposed in said chip remover and the supply of air to said ejector pump is selected from the group consisting of a blower attached to a motor, an exhaust air from an air motor and shop air.

13. The apparatus as claimed in claim 5, further comprising a clamp which is movable to secure the workpiece, wherein said actuator provides a first point, a second point and a third point, wherein the movement of said actuator from said first point to second point causes clamping the workpiece by said clamp and the movement of said actuator from said second point to third point causes said drilling module to move to cut the pocket-hole in the workpiece by said first motor.

14. The apparatus as claimed in claim 13, wherein said actuator is a lever which provides movement of said clamp and said drilling module.

15. The apparatus as claimed in claim 13, wherein said actuator is a second electric motor which provides movement of said clamp and said drilling module, wherein said first motor provides rotational torque to turn the step-drill.

16. The apparatus as claimed in claim 15, further comprising an initiation switch disposed in said fence so as to turn said first and second motors power on when the workpiece urges said initiation switch.

17. The apparatus as claimed in claim 13, further comprising a reversing switch which turns said first motor power off when said drilling module urges said reversing switch, wherein said first motor is driven by compressed air.

18. An apparatus for drilling pocket-holes into a workpiece for use cooperatively with a step-drill, comprising:
   a body, said body having a work surface defining a plane;
   a drilling module for cutting the pocket-hole, said drilling module having a motor for driving at least one step-drill, said drilling module movable in a drilling direction by an actuator, wherein the step-drill intersects said plane;
   a guide module, said drilling module mounted thereon, said drilling module slidably engaging with respect to said guide module in said drilling direction, and
   a mounting structure disposed in said body substantially at a right angle with respect to said drilling direction to mount at least one said guide module.

19. The apparatus as claimed in claim 18, further comprising at least two dowel drillers mounted on said body so as to drill dowel-holes parallel to said work surface on an edge-wall of the workpiece.

20. The apparatus as claimed in claim 18, further comprising a rail mounted on said work surface substantially parallel to said mounting structure so as to position the workpiece thereto, and a channel formed therein so as to mount at least one clamping actuator thereon.

21. The apparatus as claimed in claim 18, further comprising a rail mounted on said work surface substantially parallel to said mounting structure, wherein said rail is movable so that the depth of drilling can be adjustable.

22. The apparatus as claimed in claim 18, further comprising two drill holders each for mounting a step-drill in said drilling module and to move in a sliding direction which is at substantially a right angle with respect to said drilling direction, wherein said guide module has two guide adapters each for guiding the step-drill and to move in said sliding direction, wherein said two drill adapters connected to be driven by said motor are mounted so that the distance between the two step-drills can be adjusted.

23. The apparatus as claimed in claim 22, further comprising a rotatable screw that have oppositely pitched threads formed therein so as to engage and to move said two drill holders toward and away from each other in said sliding direction.

* * * * *